US012560837B2

(12) United States Patent (10) Patent No.: US 12,560,837 B2
Liu (45) Date of Patent: Feb. 24, 2026

(54) DISPLAY APPARATUS AND VIRTUAL REALITY DEVICE

(71) Applicant: BOE TECHNOLOGY GROUP CO., LTD., Beijing (CN)

(72) Inventor: Yujie Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 149 days.

(21) Appl. No.: 18/578,297

(22) PCT Filed: Jul. 21, 2022

(86) PCT No.: PCT/CN2022/107093
§ 371 (c)(1),
(2) Date: Jan. 10, 2024

(87) PCT Pub. No.: WO2024/016271
PCT Pub. Date: Jan. 25, 2024

(65) Prior Publication Data
US 2025/0004319 A1 Jan. 2, 2025

(51) Int. Cl.
*G02F 1/1335* (2006.01)
*G02F 1/13363* (2006.01)

(52) U.S. Cl.
CPC .. *G02F 1/133526* (2013.01); *G02F 1/133512* (2013.01); *G02F 1/133514* (2013.01); *G02F 1/133531* (2021.01); *G02F 1/133553* (2013.01); *G02F 1/133616* (2021.01); *G02F 1/133638* (2021.01)

(58) Field of Classification Search
None
See application file for complete search history.

(56) References Cited

U.S. PATENT DOCUMENTS 6,340,999 B1 * 1/2002 Masuda ............... G02B 6/0056
349/137
8,582,209 B1 11/2013 Amirparviz
(Continued)

FOREIGN PATENT DOCUMENTS

CN 103348278 A 10/2013
CN 101061422 B 1/2016
(Continued)

*Primary Examiner* — Shan Liu
(74) *Attorney, Agent, or Firm* — HOUTTEMAN LAW LLC

(57) ABSTRACT

The present disclosure provides a display apparatus, including a first substrate, and a reflective layer, a plurality of optical structure units, and a plurality of light-emitting elements, which are sequentially arranged in a direction away from the first substrate. An orthographic projection of each optical structure unit on the first substrate covers an orthographic projection of at least one light-emitting element on the first substrate, and each optical structure unit is configured to process first light emitted from the light-emitting elements to produce second light. The second light is reflected by the reflective layer back to the optical structure unit, and the second light is processed by the optical structure unit into collimated light emitted away from the first substrate. The present disclosure further provides a virtual reality device.

11 Claims, 4 Drawing Sheets

(56)     References Cited

U.S. PATENT DOCUMENTS

| | | | | |
|---|---|---|---|---|
| 2001/0046013 | A1* | 11/2001 | Noritake | G02F 1/133707 |
| | | | | 349/113 |
| 2009/0051831 | A1* | 2/2009 | Bierhuizen | G03B 21/208 |
| | | | | 349/5 |
| 2011/0018860 | A1* | 1/2011 | Parry-Jones | H04N 13/305 |
| | | | | 345/214 |
| 2019/0057957 | A1* | 2/2019 | Xie | H04N 13/307 |
| 2021/0223568 | A1* | 7/2021 | Makinen | G02B 27/4272 |
| 2022/0206314 | A1* | 6/2022 | Kim | G02B 30/27 |

FOREIGN PATENT DOCUMENTS

| | | | |
|---|---|---|---|
| CN | 106526864 | A | 3/2017 |
| JP | 10104618 | A | 4/1998 |
| JP | 10301109 | A | 11/1998 |
| JP | H10301109 | A * | 11/1998 |
| JP | 2011007832 | A * | 1/2011 |

* cited by examiner

Second direction

First direction

DISPLAY APPARATUS AND VIRTUAL REALITY DEVICE

TECHNICAL FIELD

The present disclosure relates to the field of display technology, and specifically relates to a display apparatus and a virtual reality device.

BACKGROUND

A reflective display apparatus is, for example, a reflective liquid crystal display apparatus, or an electronic paper display apparatus, or the like. Taking a reflective liquid crystal display apparatus as an example, the display principle is as follows: ambient light outside the reflective display panel, or light from a front light, impinges on and is reflected back by the reflective display panel, where the state of liquid crystal molecules is controlled such that each pixel in the reflective display panel reflects light with a different ratio, thereby implementing display.

SUMMARY

The present disclosure provides a display apparatus and a virtual reality device.

In a first aspect, the present disclosure provides a display apparatus, including:

a front light, including a base substrate, and a plurality of light-emitting elements on the base substrate; and a reflective display panel on a side of the front light away from a display side; wherein the reflective display panel further includes a first substrate, a second substrate, a reflective layer and a plurality of optical structure units, wherein the first substrate and the second substrate are opposite to each other, the reflective layer is on a side of the first substrate facing the second substrate, and the plurality of optical structure units are on a side of the reflective layer away from the first substrate: an orthographic projection of each of the plurality of optical structure units on the first substrate covers an orthographic projection of at least one of the plurality of light-emitting elements on the first substrate, and the optical structure unit is configured to process first light emitted from the light-emitting element to produce second light; and the second light is reflected by the reflective layer back to the optical structure unit, and the second light is processed by the optical structure unit into collimated light emitted away from the first substrate.

In some embodiments, the optical structure units are on a side of the second substrate facing the first substrate.

In some embodiments, each light-emitting element corresponds to one of the optical structure units, and different light-emitting elements correspond to different optical structure units; and each optical structure unit includes a condenser lens, and each light-emitting element is on an optical axis of the corresponding condenser lens and in a focal plane of the condenser lens away from the first substrate.

In some embodiments, the condenser lens includes a planar surface and a convex surface opposite to each other, the reflective display panel further includes a cover layer on a side of the convex surface of the condenser lens away from the planar surface, the cover layer includes a concave surface and a flat surface opposite to each other, the concave surface is in contact with the convex surface, and the cover layer has a refractive index smaller than a refractive index of the condenser lens.

In some embodiments, the planar surface of the condenser lens faces the second substrate, and the cover layer is on a side of the condenser lens facing the first substrate:

or, the planar surface of the condenser lens faces the first substrate, and the cover layer is between the condenser lens and the second substrate.

In some embodiments, a focal length $f_1$ of the condenser lens satisfies the following equation (1):

$$\frac{1}{f} = \frac{1}{f_1} + \frac{1}{f_1} - \frac{d}{f_1^2} \tag{1}$$

where d is twice the closest distance from a surface of the condenser lens close to the reflective layer to a reflective surface of the reflective layer; and f is a distance from a surface of the light-emitting element close to the reflective layer to the reflective surface of the reflective layer; and a curvature radius r of the convex surface, a refractive index $n_2$ of the condenser lens, and the focal length $f_1$ of the condenser lens satisfy the following equation (2):

$$f_1 = \frac{n_1}{(n_2 - n_1)} * r \tag{2}$$

where $n_1$ is a refractive index of the cover layer.

In some embodiments, the condenser lens has a thickness between 0.01 mm and 0.15 mm.

In some embodiments, the reflective display panel has a plurality of pixel regions each including a plurality of subpixel regions, and the reflective display panel further includes a color filter layer on a side of the optical structure unit facing the first substrate, including a color filter part in each subpixel region, wherein a plurality of color filter parts in each pixel region have various colors.

In some embodiments, the orthographic projection of each optical structure unit on the first substrate covers orthographic projections of the plurality of color filter parts in at least one pixel region on the first substrate.

In some embodiments, the orthographic projection of each optical structure unit on the first substrate has a first side extending in a first direction and a second side extending in a second direction; and the orthographic projection of each optical structure unit on the first substrate covers orthographic projections of m*n pixel regions on the first substrate:

where m is an integer closest to L1/P1, n is an integer closest to L2/P2, L1 is a length of the first side, L2 is a length of the second side, P1 is an arrangement period of pixel regions in the first direction, and P2 is an arrangement period of pixel regions in the second direction.

In some embodiments, the reflective display panel further includes:

a liquid crystal layer between the first substrate and the second substrate;

a first alignment layer between the reflective layer and the liquid crystal layer;

a second alignment layer between the second substrate and the liquid crystal layer; and a plurality of thin film transistors between the first substrate and the reflective layer, wherein each subpixel region is provided with a thin film transistor;

wherein the reflective layer includes a reflective electrode in each subpixel region and electrically connected to the thin film transistor in the subpixel region.

In some embodiments, the plurality of light-emitting elements in the front light are divided into a plurality of light-emitting groups arranged side by side in a first direction, wherein each light-emitting group includes a plurality of light-emitting elements arranged in a second direction intersected with the first direction; and the base substrate is further provided with a first signal line, a second signal line, a plurality of first connection lines and a plurality of second connection lines, wherein each light-emitting group corresponds to one of the first connection lines and one the second connection lines, and each light-emitting element in the light-emitting group has a first pole connected to the first signal line through a corresponding first connection line, and a second pole connected to the second signal line through a corresponding second connection line.

In some embodiments, a length of each light-emitting element in any direction parallel to the second substrate is less than 15 μm.

In some embodiments, each light-emitting element is configured to emit light at an angle less than 25°.

In some embodiments, the front light further includes a black matrix between the plurality of light-emitting elements and the base substrate, and an orthographic projection of each light-emitting element on the base substrate is within an orthographic projection of the black matrix on the base substrate.

In some embodiments, the display apparatus further includes:

a polarizer between the front light and the display panel;

a half wave plate between the polarizer and the display panel; and a quarter wave plate between the half wave plate and the display panel.

In a second aspect, an embodiment of the present disclosure further provides a virtual reality device, including the display apparatus as described above.

BRIEF DESCRIPTION OF DRAWINGS

Accompanying drawings are provided for further understanding of the present disclosure and constitute a part of the specification. Hereinafter, these drawings are intended to explain the present disclosure together with the following specific implementations, but should not be considered as a limitation of the present disclosure, in which.

DETAIL DESCRIPTION OF EMBODIMENTS

Hereinafter, specific implementations of the present disclosure will be described with respect to the accompanying drawings. It will be appreciated that the specific implementations as set forth herein are merely for the purpose of illustration and explanation of the present disclosure and should not be constructed as a limitation thereof.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. All other embodiments obtained by those of ordinary skill in the art based on the embodiments of the present disclosure described herein without paying any creative effort shall be included in the protection scope of the present disclosure.

Unless otherwise defined, technical or scientific terms used in the embodiments of the present disclosure are intended to have general meanings as understood by those of ordinary skill in the art. The words "first", "second" and similar terms used in the present disclosure do not denote any order, quantity, or importance, but are used merely for distinguishing different components from each other. Likewise, the word "comprising" or "including" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

The reflective display apparatus is, for example, a reflective liquid crystal display apparatus, or an electronic paper display apparatus, or the like. Taking a reflective liquid crystal display apparatus as an example, the display principle is as follows: ambient light outside the reflective display panel, or light from a front light, impinges on and is reflected back by the reflective display panel, where the state of liquid crystal molecules is controlled such that each pixel in the reflective display panel reflects light with a different ratio, thereby implementing display.

Figure 1:
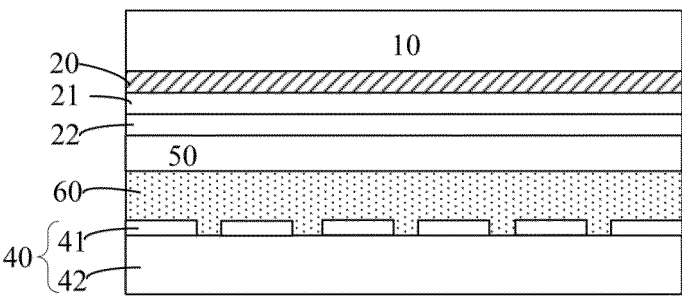
FIG. 1 is a schematic diagram of a display apparatus according to some embodiments.

FIG. 1 is a schematic diagram of a display apparatus according to some embodiments. As shown in FIG. 1, the display apparatus is a reflective display apparatus, including a reflective display panel, a front light 10, a polarizer 20, and a quarter wave plate 30. The front light 10 is provided on a display side of the reflective display panel, the polarizer 20, a half wave plate 31, and the quarter wave plate 32 are disposed between the front light 10 and the reflective display panel, and the polarizer 20, the half wave plate 31, and the quarter wave plate 32 are sequentially arranged along a direction approaching the reflective display panel.

The reflective display panel includes an array substrate 40 and an opposite substrate 50 disposed opposite to each other, and a liquid crystal layer 60 between the array substrate 40 and the opposite substrate 50. The array substrate 40 includes a plurality of sub-pixel regions each provided with a reflective electrode 41.

The principle of the display apparatus in FIG. 1 implementing display will be described below by taking the reflective display panel in a normally white mode as an example. In the reflective display panel of the normally white mode, when not energized, the liquid crystal layer 60 has a phase modulation effect on light equivalent to the quarter wave plate 30.

When bright state display is implemented, light (natural light) from a light-emitting element 12 passes through the polarizer 20 to form first linearly polarized light which then passes through the half wave plate 21 and the quarter wave plate 22 to form circularly polarized light. The circularly polarized light then passes through the liquid crystal layer 60 to be converted into second linearly polarized light. A polarization direction of the second linearly polarized light is perpendicular to a first polarization direction. After being reflected by the reflective electrode 41, the second linearly polarized light is not changed in the polarization direction, and the reflected light passes through the liquid crystal layer 60, the quarter wave plate 22, and the half wave plate 21 to be converted into third linearly polarized light, which has the same polarization direction as the first linearly polarized light, and thus can transmit and exit through the polarizer 20.

When dark state display is implemented, a voltage is applied to the liquid crystal layer 60 to disable the liquid crystal layer 60 in terms of the function on the phase of light. In this case, light (natural light) from the light-emitting element 12 passes through the polarizer 20 to form first linearly polarized light which then passes through the half wave plate 21 and the quarter wave plate 22 to form circularly polarized light. The circularly polarized light then passes through the liquid crystal layer 60 and is reflected by the reflective electrode 41 without any change. Then, the circularly polarized light passes through the liquid crystal layer 60, the quarter wave plate 22, and the half wave plate 21 to form second linearly polarized light. In this case, the second linearly polarized light has a polarization direction perpendicular to the first linearly polarized light, and cannot be emitted from the polarizer 20, resulting in a black screen displayed on the reflective display apparatus.

When an intermediate state display is implemented (i.e., when a gray screen between a white screen and a black screen is displayed), a voltage is applied to the liquid crystal layer 60 to cause a certain deflection of the liquid crystal layer 60. In this case, light (natural light) from a light-emitting element 12 passes through the polarizer 20 to form first linearly polarized light which then passes through the half wave plate 21 and the quarter wave plate 22 to form elliptically polarized light. Taking the elliptically polarized light being left elliptically polarized light as an example, the left elliptically polarized light is converted into right elliptically polarized light after being reflected by the reflective electrode 41, and then passes through the liquid crystal layer 60, the quarter wave plate 22, and the half wave plate 21 to form fourth linearly polarized light. A polarization direction of the fourth linearly polarized light and the polarization direction of the first linearly polarized light form an angle greater than 0°) and less than 90°, so that part of the light is emitted through the polarizer 20 to form a gray scale screen.

In the display apparatus of FIG. 1, the pixel regions emit light toward different angles while implementing display, and in this case, the display apparatus can only be applied to conventional display products such as mobile phones, televisions, and the like. When the display apparatus of FIG. 1 is applied to a virtual reality product, it is difficult for human eyes to receive light of all pixel regions, thereby impairing the user experience.

Figure 2:
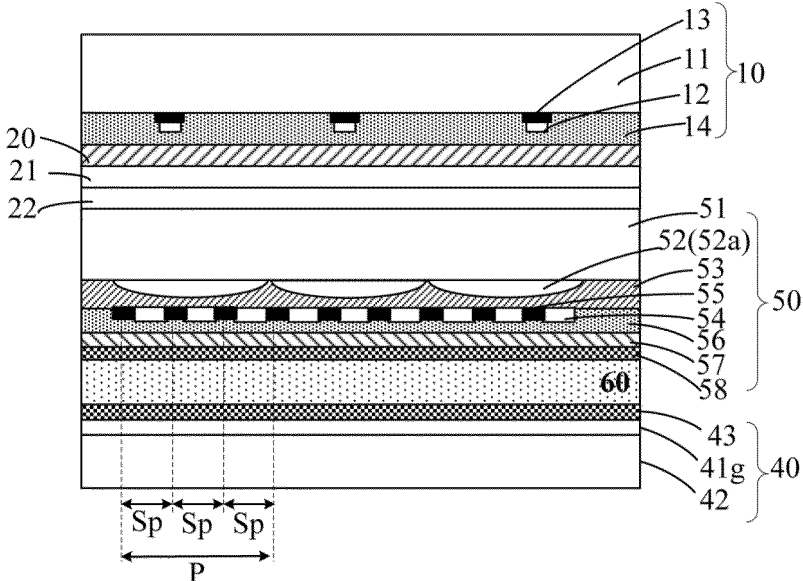
FIG. 2 is a schematic diagram of a display apparatus according to some embodiments of the present disclosure.

FIG. 2 is a schematic diagram of a display apparatus according to some embodiments of the present disclosure. As shown in FIG. 2, The display apparatus includes a front light 10 and a reflective display panel.

The front light 10 includes a base substrate 11, and a plurality of light-emitting elements 12 on the base substrate 11. The base substrate 11 is a transparent substrate, which may be a glass substrate, or a substrate made of a flexible material such as polyimide (PI). The light-emitting elements 12 may be light-emitting diodes (LEDs), such as micro-LEDs/mini-LEDs.

The reflective display panel is provided on a side of the front light 10 away from a display side. The display side refers to a side for viewing a display screen of the display apparatus. Specifically, the light-emitting elements 12 emit light toward a side away from the base substrate 11, and the reflective display panel is provided on a side of the light-emitting elements 12 away from the base substrate 11. The reflective display panel includes an array substrate 40 and an opposite substrate 50 disposed opposite to each other. The array substrate 40 includes a first substrate 42 and a reflective layer 41g on the first substrate 42. The reflective layer 41g is provided on a side of the first substrate 42 facing the opposite substrate 50. The opposite substrate 50 includes a second substrate 51. A plurality of optical structure units 52 are provided on a side of the reflective layer 41g away from the first substrate 42. An orthographic projection of each optical structure unit 52 on the first substrate 42 covers an orthographic projection of at least one light-emitting element 12 on the first substrate 42, and each optical structure unit 52 is configured to process first light emitted from the light-emitting elements 12 to produce second light. The second light is reflected by the reflective layer 41g back to the optical structure unit 52, where the second light is processed into collimated light emitted away from the first substrate 42.

It should be noted that the collimated light in the embodiments of the present disclosure refers to light with an emission direction substantially the same as a thickness direction of the reflective display panel. For example, an angle between the emission direction and the thickness direction of the reflective display panel may have a certain error margin, for example, 0°) to 10°, and for example, the angle between the emission direction of the collimated light and the thickness direction of the reflective display panel is 3°, or 5°, or 8°, or 10°, or the like. Apparently, the emission direction may be completely the same as the thickness direction of the reflective display panel.

In the embodiments of the present disclosure, the final light emitted from the display apparatus can be collimated light through the cooperation of the optical structure units 52 and the reflective layer 41g, so that various pixels in the display apparatus emit light at substantially the same angle, and when the display apparatus is applied to a virtual reality device, human eyes can receive the light of all pixel regions, thereby improving the user experience.

Figure 3:
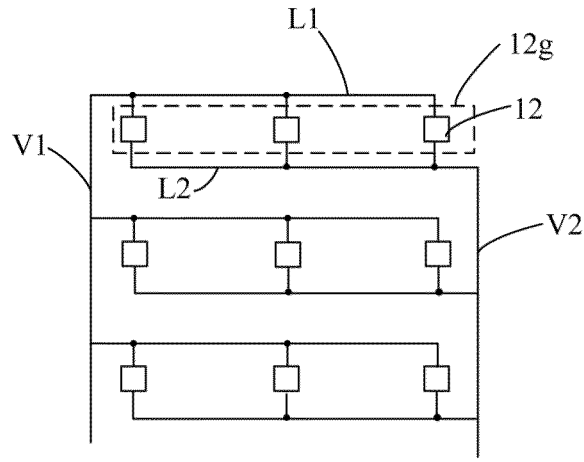
FIG. 3 is a schematic diagram showing an arrangement of light-emitting elements according to some embodiments of the present disclosure.
Figure 3:
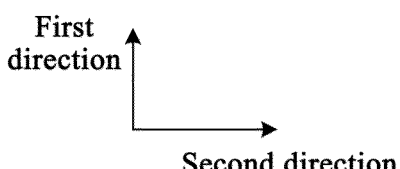

FIG. 3 is a schematic diagram showing an arrangement of light-emitting elements according to some embodiments of the present disclosure. As shown in FIG. 3, the plurality of light-emitting elements 12 may be divided into a plurality of light-emitting groups 12g arranged side by side in a first direction. Each light-emitting group 12g includes a plurality of light-emitting elements 12 arranged in a second direction intersected with the first direction. For example, the first direction is perpendicular to the second direction.

The base substrate 11 is further provided with a first signal line V1, a second signal line V2, a plurality of first connection lines L1 and a plurality of second connection lines L2. Each light-emitting group 12g corresponds to one of the first connection lines L1 and one of the second connection lines L2, and each light-emitting element 12 in the light-emitting group 12g has a first pole connected to the first signal line V1 through a corresponding first connection line L1, and a second pole connected to the second signal line V2 through a corresponding second connection line L2. The first pole of the light-emitting element 12 may be an anode, and the second pole may be a cathode.

The light-emitting element 12 may have a relatively small size. Optionally, a length of the light-emitting element 12 in any direction parallel to the second substrate 51 is less than 15 μm, so that an aperture ratio of the display apparatus, as well as the light utilization rate, is increased. For example, if the light-emitting element 12 has a circular orthographic projection on the base substrate 11, a diameter of the light-emitting element 12 is less than 15 μm. For another example, if the light-emitting element 12 has a rectangular orthographic projection on the base substrate 11, a length of a diagonal line of the rectangle is less than 15 μm.

As shown in FIG. 2, the front light 10 further includes a first black matrix 13 on the base substrate 11. The first black matrix 13 is located between the light-emitting elements 12 and the base substrate 11, and the orthographic projection of each light-emitting element 12 on the base substrate 11 is located within an orthographic projection of the first black matrix 13 on the base substrate 11. In addition, orthographic projections of the first signal line V1, the second signal line V2, the first connection lines L1, and the second connection lines L2 on the base substrate 11 are also located within the orthographic projection of the first black matrix 13 on the base substrate 11.

In some embodiments, the reflective display panel is a liquid crystal display panel, and as shown in FIG. 2, the reflective display panel includes an array substrate 40, an opposite substrate 50, and a liquid crystal layer 60 between the array substrate 40 and the opposite substrate 50.

Figure 4:
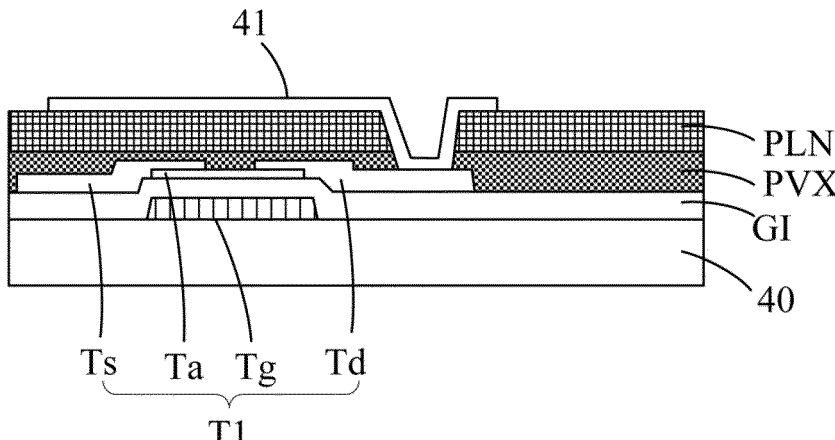
FIG. 4 is a schematic partial structural diagram of an array substrate according to some embodiments of the present disclosure.

FIG. 4 is a schematic partial structural diagram of an array substrate according to some embodiments of the present disclosure. As shown in FIGS. 2 and 4, the liquid crystal display panel includes a plurality of pixel regions which may be arranged in an array. Each pixel region includes a plurality of subpixel regions Sp, and the plurality of subpixel regions Sp in each pixel region may include a red subpixel region, a green subpixel region, and a blue subpixel region. Only the structure of the array substrate 40 corresponding to one subpixel region Sp is shown in FIG. 4.

As shown in FIG. 4, the array substrate 40 includes a first substrate 42, and a thin film transistor T1, a reflective electrode 41, and a first alignment layer 43 on the first substrate 42. The thin film transistor T1 may be a bottom-gate type thin film transistor T1 or a top-gate type thin film transistor T1. Taking the thin film transistor T1 being a bottom-gate type thin film transistor T1 as an example, a gate Tg of the thin film transistor is provided on the first substrate 42, an active layer Ta is provided on a side of the gate Tg away from the base substrate 11, and the active layer Ta and the gate Tg are separated by a gate insulating layer GI. The gate Tg may be made of a material including, for example, a metal, a metal alloy, a metal nitride, a conductive metal oxide, a transparent conductive material, or the like. For example, the gate Tg may include gold, an alloy of gold, silver, an alloy of silver, aluminum, an alloy of aluminum, aluminum nitride, tungsten, tungsten nitride, copper, an alloy of copper, nickel, chromium, chromium nitride, molybdenum, an alloy of molybdenum, titanium, titanium nitride, platinum, tantalum, tantalum nitride, neodymium, scandium, strontium ruthenium oxide, zinc oxide, tin oxide, indium oxide, gallium oxide, indium tin oxide, indium zinc oxide, or the like. The gate Tg may have a single layer or may have a plurality of layers.

The gate insulating layer GI may be made of a material including, for example, a silicon compound or a metal oxide. For example, the gate insulating layer GI may be made of a material including silicon oxynitride, silicon oxide, silicon nitride, silicon oxy carbide, silicon carbonitride, aluminum oxide, aluminum nitride, tantalum oxide, hafnium oxide, zirconium oxide, titanium oxide, or the like. The gate insulating layer GI may be formed into a single-layer or multi-layer structure.

The active layer Ta includes a channel part, and a source connection part and a drain connection part on two sides of the channel part, respectively. The source is lapped on the source connection part, and the drain is lapped on the drain connection part. Each of the source connection part and the drain connection part may be doped with an impurity (e.g., an N-type impurity or a P-type impurity) of a higher concentration than a concentration of the impurity in the channel part. The channel part is directly opposed to the gate Tg of the thin film transistor T1, and when a voltage signal applied to the gate Tg reaches a predetermined value, a carrier path is formed in the channel part, so that it is turned conductive between the source and the drain of the thin film transistor T1. The source and the drain may include a metal, an alloy, a metal nitride, a conductive metal oxide, a transparent conductive material, or the like, and each of the source electrode and the drain may be a single-layer or multi-layer structure composed of a metal.

A passivation layer PVX is provided on a side of the thin film transistor T1 away from the first substrate 42, and may be made of a material including, for example, silicon oxynitride, silicon oxide, silicon nitride, or the like. A planarization layer PLN is provided on a side of the passivation layer PVX away from the first substrate 4211, and may be made of an organic insulating material including, for example, a resin-based material such as polyimide, epoxy, acryl, polyester, photoresist, polyacrylate, polyamide, siloxane, or the like.

The reflective layer 41g includes a plurality of reflective electrodes 41, and each subpixel region Sp is provided with a reflective electrode 41. The reflective electrode 41 is connected to the drain of the thin film transistor T1 through a via running through the planarization layer PLN and the passivation layer PVX. The reflective electrode 41 may have a multi-layer structure. For example, the reflective electrode 41 is a stack of ITO/Ag/ITO.

The opposite substrate 50 includes a second substrate 51, and a plurality of optical structure units 52 on the second substrate 51. In some embodiments, each light-emitting element 12 corresponds to one of the optical structure units 52, and different light-emitting elements 12 correspond to different optical structure units 52. Each optical structure unit 52 includes a condenser lens 52a, and each light-emitting element 12 is positioned on an optical axis of the corresponding condenser lens 52a and in a focal plane of the condenser lens 52a away from the first substrate 42, so that the light from the light-emitting element 12 is converged by the condenser lens 52a.

Providing the optical structure unit 52 on the second substrate 51 can facilitate the manufacturing process. The optical structure unit 52 may be provided on a side of the second substrate 51 facing the first substrate 42, or on a side of the second substrate 51 away from the first substrate 42.

In some embodiments, the light-emitting element 12 may emit white light, and in this case, to implement color display, as shown in FIG. 2, the opposite substrate 50 further includes a color filter layer on the second substrate 51. For ease of manufacturing, in some embodiments, the color filter layer is provided on a side of the plurality of optical structure units 52 facing the first substrate 42. The color filter layer includes a color filter part 54 in each subpixel region Sp. A plurality of color filter parts 54 in each pixel region P have various colors. For example, the plurality of color filter parts 54 in each pixel region P have red, green and blue colors. In addition, the color filter layer may further include a second black matrix 55 that separates different color filter parts 54 in the same pixel region. Apparently, the color filter parts 54 in different pixel regions may also be spaced apart by the second black matrix 55.

The orthographic projection of each optical structure unit 52 on the first substrate 42 may cover orthographic projections of the plurality of color filter parts 54 in at least one pixel region P on the first substrate 42.

It should be noted that FIG. 2 merely illustrates the optical structure units 52 between the second substrate 51 and the color filter layer only as an example, but in other embodiments, the optical structure unit 52 may be provided on a side of the color filter layer away from the second substrate 51.

In some embodiments, where the optical structure unit 52 includes the condenser lens 52a, the condenser lens 52a includes a planar surface and a convex surface disposed opposite to each other. In addition, as shown in FIG. 2, the reflective display panel further includes a first cover layer 53 on a side of the convex surface of the condenser lens 52a away from the planar surface, and the first cover layer 53 includes a concave surface and a flat surface disposed opposite to each other. The concave surface is in contact with the convex surface, and the flat surface may be in contact with another structure. For example, where the condenser lens 52a is located between the second substrate 51 and the color filter layer, and between the first cover layer 53 and the second substrate 51, the color filter layer may be provided on the flat surface of the first cover layer 53. The first cover layer 53 has a refractive index smaller than that of the condenser lens 52a, so that the condenser lens 52a can play a light converging function.

To facilitate manufacture of the condenser lens 52a and reduce an overall thickness of the reflective display panel, as shown in FIG. 2, the condenser lens 52a may be provided on a side of the second substrate 51 facing the first substrate 42, the first cover layer 53 may be provided on a side of the condenser lens 52a away from the second substrate 51, a surface of the condenser lens 52a facing the second substrate 51 may be set as a planar surface, and a surface of the condenser lens 52a facing the first substrate 42 may be set as a convex surface. In this case, as shown in FIG. 2, the first cover layer 53 is in contact with the convex surface, and a surface of the first cover layer 53 away from the second substrate 51 is a flat surface, on which the color filter layer is provided, thereby facilitating provision of the color filter layer. The first cover layer 53 has a refractive index smaller than that of the condenser lens 52a, and the first cover layer 53 may be a transparent optical adhesive layer.

It should be noted that the flat surface refers to a surface with relatively high flatness. For example, a height difference between any two points on the flat surface is smaller than 1/10 of an arch height of the condenser lens 52a. Apparently, the flat surface may also be a planar surface.

It should be noted that, in other embodiments, it is also possible that the condenser lens 52a is provided on a side of the second substrate 51 facing the first substrate 42, and the first cover layer 53 is provided between the condenser lens 52a and the second substrate 51. In this case, the planar surface of the condenser lens 52a faces the first substrate 42, the convex surface faces the second substrate 51, and the color filter layer may be in contact with the planar surface of the condenser lens 52a.

As shown in FIG. 2, a first alignment layer 43 is further provided on a side of the reflective layer 41g away from the first substrate 42, a second alignment layer 58 is provided on a side of the color filter layer away from the second substrate 51, the reflective display panel further includes a liquid crystal layer 60 between the first alignment layer 43 and the second alignment layer 58, and the first alignment layer 43 and the second alignment layer 58 are used for alignment of liquid crystal molecules in the liquid crystal layer 60.

In addition, the opposite substrate 50 may further include a third cover layer 56 and a common electrode 57 on the second substrate 51, and the third cover layer 56, located between the second alignment layer 58 and the color filter layer, may have a planarization function. The common electrode 57 is located between the third cover layer 56 and the second alignment layer 58, and different voltages are applied to the common electrode 57 and the reflective electrode 41 to form an electric field between the common electrode 57 and the reflective electrode 41, thereby driving liquid crystal molecules in the corresponding subpixel region Sp to deflect.

As shown in FIG. 2, the display apparatus further includes a second cover layer 14, a polarizer 20, a half wave plate 21, and a quarter wave plate 22. The second cover layer 14 is located on a side of the plurality of light-emitting elements 12 away from the base substrate 11, and the polarizer 20, which is a linear polarizer 20, is provided between the second cover layer 14 and the display panel. The half wave plate 21 is provided between the polarizer 20 and the display panel; and the quarter wave plate 22 is provided between the half wave plate 21 and the reflective display panel.

The subpixel region Sp may exhibit the desired brightness through modulation of the polarization direction of light by the polarizer 20, the half wave plate 21, the quarter wave plate 22, and the liquid crystal layer 60, and the reflection of light by the reflective electrode 41. For the specific principle, reference may be made to the foregoing description of FIG. 1, and details are not repeated here.

Figure 5A:
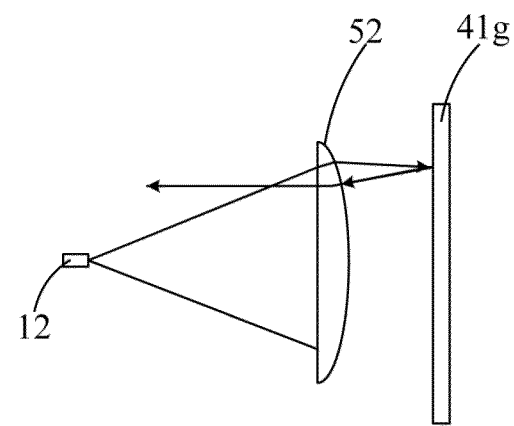
FIG. 5A is a schematic diagram showing an optical path of light emitted by a light-emitting element according to some embodiments of the present disclosure.
Figure 5B:
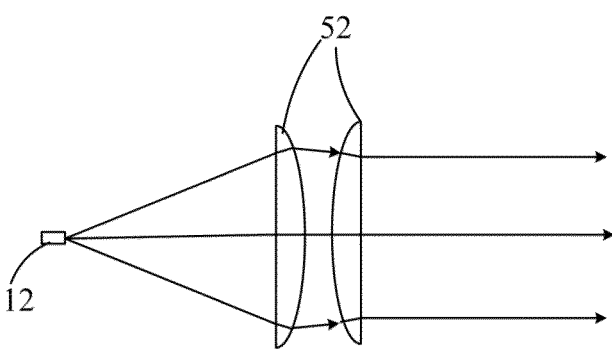
FIG. 5B is a schematic view of an equivalent optical path of light emitted by a light-emitting element according to some embodiments of the present disclosure.

FIG. 5A is a schematic diagram showing an optical path of light emitted by a light-emitting element according to some embodiments of the present disclosure, and FIG. 5B is a schematic view of an equivalent optical path of light emitted by a light-emitting element according to some embodiments of the present disclosure. As shown in FIGS. 5A and 5B, after being modulated by the condenser lens 52a, light emitted from a light-emitting element 12 then impinges on the reflective layer 41g, where the light is reflected to the condenser lens 52a, and modulated by the condenser lens 52a again to form collimated light. The light is modulated by the condenser lens 52a twice, equivalent to passing through two condenser lenses 52a (i.e., a lens group).

A focal length f of the lens group and a focal length $f_1$ of the condenser lens 52a satisfy the following equation (1):

$$\frac{1}{f} = \frac{1}{f_1} + \frac{1}{f_1} - \frac{d}{f_1^2} \qquad (1)$$

where d is a distance of an optical path between the two condenser lenses 52a in the lens group, that is, twice the closest distance from a surface of the condenser lens 52a close to the reflective layer 41g to a reflective surface of the reflective layer 41g. Specifically, in the reflective display panel shown in FIG. 2, d=(thickness of the color filter layer+thickness of the common electrode 57+thickness of the first alignment layer 43+thickness of the liquid crystal layer 60+thickness of the second alignment layer 58)×2. The reflective surface is a surface of the reflective layer 41g configured to reflect light.

The focal length f of the lens group is a distance from a surface of the light-emitting element 12 close to the reflective layer 41g to the reflective surface of the reflective layer 41g. For example, a surface of the reflective layer 41g facing the second substrate 51 is the reflective surface, and in this case, f is equal to a sum of the thicknesses of the second cover layer, the polarizer 20, the second substrate 51, the condenser lens 52a, the first cover layer 53, the color filter layer, the common electrode 57, the first alignment layer 43, the second alignment layer 58, and the liquid crystal layer 60. In one example, the sum of the thicknesses of the second cover layer, the polarizer 20, the second substrate 51, the first cover layer 53, the color filter layer, the common electrode 57, the first alignment layer 43, the second alignment layer 58, and the liquid crystal layer 60 is about 0.755 mm, that is, f is about a sum of 0.755 mm and the thickness of the condenser lens 52a.

A curvature radius r of the convex surface of the condenser lens 52a, a refractive index $n_2$ of the condenser lens 52a, and the focal length $f_1$ of the condenser lens 52a satisfy the following equation (2):

$$f_1 = \frac{n_1}{(n_2 - n_1)} * r \qquad (2)$$

where $n_1$ is a refractive index of the first cover layer 53. Here, $n_1$ may take a possible minimum value, so that when the focal length $f_1$ is determined, the curvature radius r is as large as possible, which is beneficial to reducing the thickness of the condenser lens 52a. In some embodiments, $n_1$ is between 1.3 and 1.6. For example, $n_1$ is 1.4, and $n_2$ is 1.7.

In practical applications, in design of the specific shape of the condenser lens 52a, the thickness of the condenser lens 52a may be set first, then the value f may be determined, then the focal length $f_1$ of the condenser lens 52a is determined according to equation (1), and then the curvature radius of the condenser lens 52a is determined according to a refractive index of the condenser lens 52a.

Considering that a thicker condenser lens 52a will lead to a larger aperture of the condenser lens 52a, light will be emitted from the light-emitting element 12 to the condenser lens 52a in a larger angular range. The energy and the emission angle of light emitted from the light-emitting element 12 satisfy cosine distribution. Light emitted at a smaller emission angle has higher energy, and light emitted at a larger emission angle has lower energy, and if the light is emitted to the condenser lens 52a in a larger angular range, the plurality of subpixels covered by the condenser lens 52a may have poor uniformity in brightness. To improve the display uniformity, in an embodiment of the present disclosure, when a distance from the light-emitting element 12 to the condenser lens 52a is determined, the emission angle of light emitted from the light-emitting element 12 to the condenser lens 52a may be set to be less than 25° by setting the thickness of the condenser lens 52a, so that the uniformity in light emission energy of the respective subpixels may be higher than 90%. The emission angle of light refers to an angle between an emission direction of the light and an optical axis direction of the condenser lens 52a.

If a maximum emission angle of the light emitted from the light-emitting element 12 to the condenser lens 52a is θ, then θ and the aperture D of the condenser lens 52a satisfy equation (3):

$$\tan \theta = \frac{D/2}{H} \qquad (3)$$

where H is a distance from the light-emitting element 12 to the condenser lens 52a.

Figure 6:
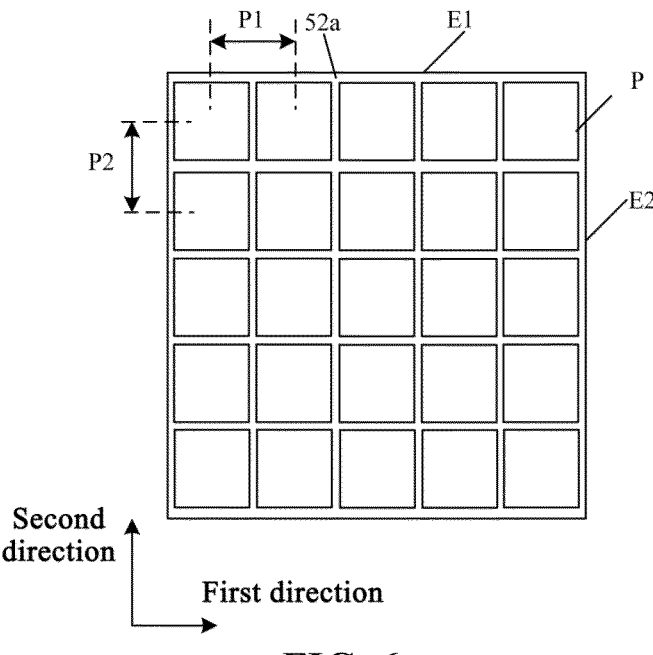
FIG. 6 is a schematic plan view of a condenser lens and a pixel region.

In some embodiments, an orthographic projection of the condenser lens 52a on the first substrate has an approximately square shape, and in this case, the aperture of the condenser lens 52a is a side length in a positive direction. After the aperture of the condenser lens 52a is determined, a correspondence relationship between the condenser lens 52a and the pixel region may be determined according to the aperture size of the condenser lens 52a and an arrangement period of pixel regions. FIG. 6 is a schematic plan view of a condenser lens and a pixel region. As shown in FIG. 6, the orthographic projection of the condenser lens 52a on the first substrate includes a first side E1 extending in a first direction, and a second side extending in a second direction which is, for example, perpendicular to the first direction. A length of the first side E1 is denoted as L1, and a length of the second side E2 is denoted as L2. An arrangement period of pixel regions in the first direction is P1, and an arrangement period of pixel regions in the second direction is P2. Then, an orthographic projection of the condenser lens 52a on the first substrate covers orthographic projections of m*n pixel regions P on the first substrate 42: where m is an integer closest to L1/P1, n is an integer closest to L2/P2.

The arrangement period of pixel regions P in the first direction refers to a center-to-center distance between two adjacent pixel regions P in the first direction; and the arrangement period of pixel regions P in the second direction refers to a center-to-center distance between two adjacent pixel regions P in the second direction.

In some embodiments, H is 0.75 mm, f is 10 μm, and the sum of the thicknesses of the second cover layer, the polarizer 20, the second substrate 51, the first cover layer 53, the color filter layer, the common electrode 57, the first alignment layer 43, the second alignment layer 58, and the liquid crystal layer 60 is about 0.755 mm. Table 1 shows parameters of the condenser lens 52a and the maximum emission angle θ of the light emitted from the light-emitting element 12 to the condenser lens 52a in several examples.

TABLE 1

| Thickness of condenser lens (mm) | Focal length f of lens group (mm) | Focal length $f_1$ of condenser lens (mm) | Aperture D of condenser lens (mm) | Maximum emission angle θ (degree) |
|---|---|---|---|---|
| 0.01 | 0.765 | 2.61 | 0.21 | 8 |
| 0.02 | 0.775 | 2.58 | 0.29 | 11 |
| 0.03 | 0.785 | 2.54 | 0.36 | 13 |
| 0.04 | 0.795 | 2.51 | 0.41 | 15 |
| 0.05 | 0.805 | 2.48 | 0.45 | 17 |
| 0.06 | 0.815 | 2.45 | 0.49 | 18 |
| 0.07 | 0.825 | 2.42 | 0.52 | 19 |
| 0.08 | 0.835 | 2.39 | 0.55 | 20 |
| 0.09 | 0.845 | 2.36 | 0.58 | 21 |
| 0.1 | 0.855 | 2.33 | 0.60 | 22 |
| 0.15 | 0.855 | 2.20 | 0.69 | 25 |

In practical applications, the number of arranged pixels may be designed based on the above optional aperture values according to the different requirements on the pixel density. For example, the pixel density is 500 PPI, the pixel region has a size of 51 μm*51 μm, and if the condenser lens 52a has a thickness of 0.07 mm and an aperture of 0.52 mm, then one condenser lens 52a corresponds to 10*10 pixel regions. In other words, the orthographic projection of one condenser lens 52a on the first substrate 42 covers orthographic projections of 10*10 pixel regions on the first substrate 42.

Figure 7:
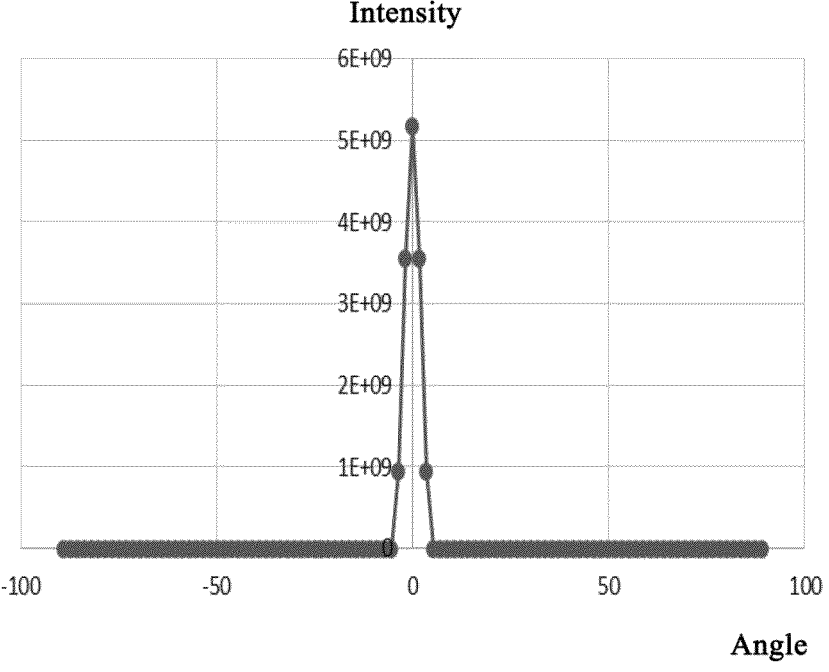
FIG. 7 is a schematic diagram showing angular distribution of exiting light from a display apparatus according to some embodiments of the present disclosure.

FIG. 7 is a schematic diagram showing angular distribution of exiting light from a display apparatus according to some embodiments of the present disclosure. As shown in FIG. 7, in the display apparatus provided in the embodiments of the present disclosure, an exit angle of light from the display apparatus may be controlled greater than or equal to −3.5° and less than or equal to 3.5°, through cooperation of the optical structure unit 52 and the reflective layer 41g. It will be appreciated that a positive exit angle indicates that light exits from one side of the normal; and a negative exit angle indicates that light exits from the other side of the normal.

In addition, in a transmissive display panel provided with two polarizers having orthogonal polarization directions on two sides of the transmissive display panel, the liquid crystal layer is equivalent to a half wave plate: in the reflective display panel, however, light from the light-emitting element 12 is twice modulated by the liquid crystal layer 60, and the liquid crystal layer 60 is equivalent to a quarter wave plate. Therefore, the liquid crystal layer 60 in the reflective display panel can be set to have a smaller thickness. When an electric field is applied to or removed from the liquid crystal layer 60, response time of the liquid crystal is related to the thickness of the liquid crystal layer 60. A response speed $t_{on}$ of the liquid crystal when the electric field is applied, and a response speed $t_{off}$ of the liquid crystal when the electric field is removed satisfy the following equation:

$$t_{off} = \frac{\gamma d^2}{\pi^2 K_{eff}}$$

$$t_{on} = \frac{\gamma d^2}{\varepsilon_0 \Delta \varepsilon \left( V^2 - V_{th}^2 \right)} = \frac{\gamma d^2}{\pi^2 K_{eff}} \frac{1}{\left( \frac{V^2}{V_{th}^2} - 1 \right)}$$

$$K_{eff} = K_{11} + \frac{1}{4}(K_{33} - 2K_{22}), \quad V_{th} = \pi \sqrt{\frac{K_{eff}}{\varepsilon_0 \Delta \varepsilon}}$$

where d is a thickness of the liquid crystal layer 60, γ is a rotational viscosity of liquid crystal molecules, $K_{eff}$ is an equivalent elastic coefficient of the liquid crystal molecules, $\varepsilon_0$ is a dielectric constant in vacuum, $\Delta \varepsilon$ is a difference between parallel and vertical dielectric constants of the liquid crystal layer 60, $V_{th}$ is a threshold voltage (i.e., a voltage at which the liquid crystal layer 60 is driven to a maximum transmission state), and $K_{11}$, $K_{22}$, and $K_{33}$ are elastic coefficients of splay, bend, and twist.

It can be seen that the response time of the liquid crystal is proportional to a square of the thickness of the liquid crystal layer 60, and therefore, compared with the transmissive display panel, the reflective display panel provided in the embodiments of the present disclosure can reduce the response time, and thus increase a refresh frequency of the display screen.

In the reflective display panel, a support structure, such as a spacer pillar or microspheres, made of a softer material may be further provided between the array substrate 40 and the opposite substrate 50 to provide support for the display panel.

A manufacturing process of the display apparatus provided in the embodiments of the present disclosure is as follows.

At S1, manufacturing a front light 10 and a reflective display panel, respectively.

A process of manufacturing the front light 10 includes: forming a first black matrix 13 on a base substrate 11: then forming the first connection lines L1, the second connection lines L2, the first signal line V1, and the second signal line V2 as described above: then forming a plurality of light-emitting elements 12 on the base substrate 11 by means of transfer printing, where a first pole of each light-emitting element 12 is connected to one of the first connection lines L1, and a second pole of each light-emitting element 12 is connected to one of the second connection lines L2; and finally, forming a second cover layer covering the plurality of light-emitting elements 12.

A process of manufacturing the reflective display panel includes: forming a thin film transistor T1, a reflective layer 41g, and a first alignment layer 43 on a first substrate 42 to obtain an array substrate 40: sequentially forming an optical structure unit 52, a first cover layer 53, a color filter layer, a third cover layer 56, a common electrode 57, and a second alignment layer 58 on a second substrate 51 to obtain an opposite substrate 50; and forming a sealant on one of the array substrate 40 or the opposite substrate 50, dripping liquid crystal within a range surrounded by the sealant, and then aligning and assembling the array substrate 40 and the opposite substrate 50 to obtain the reflective display panel.

At S2, sequentially forming a quarter wave plate 22, a half wave plate 21, and a polarizer 20 on the second substrate 51, which are then fixedly connected to the front light 10.

Figure 8:
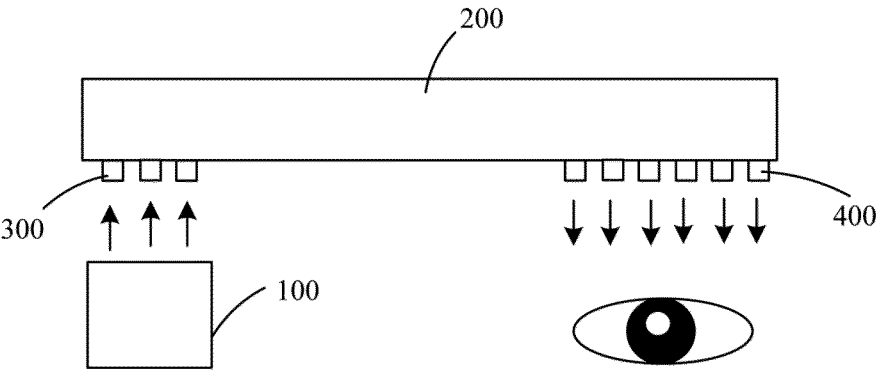
FIG. 8 is a schematic diagram of a virtual reality device according to some embodiments of the present disclosure.

An embodiment of the present disclosure further provides a virtual reality device, including the display apparatus according to any of the above embodiments. FIG. 8 is a schematic diagram of a virtual reality device according to some embodiments of the present disclosure. As shown in FIG. 8, the virtual reality device includes a display apparatus 100, an optical waveguide 200, an incoupling grating 300, and an outcoupling grating 400. The incoupling grating 300 is provided on a surface of the optical waveguide 200 and disposed opposite to the display apparatus 100, and the incoupling grating 300 is configured to couple light emitted from the display apparatus 100 into the optical waveguide 200 for total reflection and propagation. The outcoupling grating 400 is provided on a surface of the optical waveguide 200, and configured to couple out the light totally reflected and propagated in the optical waveguide 200 to form exiting light emitted toward human eyes.

It will be appreciated that the above implementations are merely exemplary implementations for the purpose of illustrating the principle of the present disclosure, and the present disclosure is not limited thereto. It will be apparent to those of ordinary skill in the art that various modifications and variations may be made without departing from the spirit or essence of the present disclosure. Such modifications and variations should also be considered as falling into the protection scope of the present disclosure.

What is claimed is:

1. A display apparatus, comprising:

a front light, comprising a base substrate, and a plurality of light-emitting elements on the base substrate; and a reflective display panel on a side of the front light away from a display side; wherein the reflective display panel comprises a first substrate, a second substrate, a reflective layer and a plurality of optical structure units, wherein each optical structure unit comprises a condenser lens, the first substrate and the second substrate are opposite to each other, the plurality of optical structure units are provided on a side of the second substrate facing the first substrate, a cover layer is provided on a side of the condenser lens away from the second substrate, a surface of the condenser lens facing the second substrate is set as a planar surface, the cover layer has a refractive index smaller than that of the condenser lens, the reflective layer is on a side of the first substrate facing the second substrate, and the plurality of optical structure units are on a side of the reflective layer away from the first substrate; an orthographic projection of each of the plurality of optical structure units on the first substrate covers an orthographic projection of at least one of the plurality of light-emitting elements on the first substrate, and the optical structure unit is configured to process first light emitted from the light-emitting element to produce second light; and the second light is reflected by the reflective layer back to the optical structure unit, and the second light is processed by the optical structure unit into collimated light emitted away from the first substrate, wherein the reflective display panel has a plurality of pixel regions each comprising a plurality of subpixel regions, and the reflective display panel further comprises a color filter layer on a side of the optical structure unit facing the first substrate, comprising a color filter part in each subpixel region, wherein a plurality of color filter parts in each pixel region have various colors, and the color filter layer is provided on a surface of the first cover layer away from the second substrate, wherein the orthographic projection of each optical structure unit on the first substrate covers orthographic projections of the plurality of color filter parts in at least one pixel region on the first substrate, wherein each light-emitting element corresponds to one of the optical structure units, and different light-emitting elements correspond to different optical structure units; and each light-emitting element is on an optical axis of the corresponding condenser lens and in a focal plane of the condenser lens away from the first substrate, wherein a focal length f1 of the condenser lens satisfies the following equation (1):

$$f = \frac{1}{f_1} + \frac{1}{f_1} - \frac{d}{f_1^2} \tag{1}$$

where d is twice the closest distance from a surface of the condenser lens close to the reflective layer to a reflective surface of the reflective layer; and f is a distance from a surface of the light-emitting element close to the reflective layer to the reflective surface of the reflective layer; and a curvature radius r of a convex surface of the condenser lens, a refractive index n2 of the condenser lens, and the focal length f1 of the condenser lens satisfy the following equation (2):

$$f_1 = \frac{n_1}{(n_2 - n_1)} * r \tag{2}$$

where n1 is a refractive index of the cover layer.

2. The display apparatus according to claim 1, wherein the planar surface and the convex surface are opposite to each other, the cover layer comprises a concave surface and a flat surface opposite to each other, and the concave surface is in contact with the convex surface.

3. The display apparatus according to claim 1, wherein the condenser lens has a thickness between 0.01 mm and 0.15 mm.

4. The display apparatus according to claim 1, wherein the orthographic projection of each optical structure unit on the first substrate has a first side extending in a first direction and a second side extending in a second direction; and the orthographic projection of each optical structure unit on the first substrate covers orthographic projections of m*n pixel regions on the first substrate;

where m is an integer closest to L1/P1, n is an integer closest to L2/P2, L1 is a length of the first side, L2 is a length of the second side, P1 is an arrangement period of pixel regions in the first direction, and P2 is an arrangement period of pixel regions in the second direction.

5. The display apparatus according to claim 1, wherein the reflective display panel further comprises:

a liquid crystal layer between the first substrate and the second substrate;

a first alignment layer between the reflective layer and the liquid crystal layer;

a second alignment layer between the second substrate and the liquid crystal layer; and a plurality of thin film transistors between the first substrate and the reflective layer, wherein each subpixel region is provided with a thin film transistor;

wherein the reflective layer comprises a reflective electrode in each subpixel region and electrically connected to the thin film transistor in the subpixel region.

6. The display apparatus according to claim 1, wherein the plurality of light-emitting elements in the front light are divided into a plurality of light-emitting groups arranged side by side in a first direction, wherein each light-emitting group comprises a plurality of light-emitting elements arranged in a second direction intersected with the first direction; and the base substrate is further provided with a first signal line, a second signal line, a plurality of first connection lines and a plurality of second connection lines, wherein each light-emitting group corresponds to one of the first connection lines and one the second connection lines, and each light-emitting element in the light-emitting group has a first pole connected to the first signal line through a corresponding first connection line, and a second pole connected to the second signal line through a corresponding second connection line.

7. The display apparatus according to claim 1, wherein a length of each light-emitting element in any direction parallel to the second substrate is less than 15 μm.

8. The display apparatus according to claim 1, wherein each light-emitting element is configured to emit light at an angle less than 25°.

9. The display apparatus according to claim 1, wherein the front light further comprises a black matrix between the plurality of light-emitting elements and the base substrate, and an orthographic projection of each light-emitting element on the base substrate is within an orthographic projection of the black matrix on the base substrate.

10. The display apparatus according to claim 1, wherein the display apparatus further comprises:

a polarizer between the front light and the display panel;

a half wave plate between the polarizer and the display panel; and a quarter wave plate between the half wave plate and the display panel.

11. A virtual reality device, comprising the display apparatus according to claim 1.

* * * * *